United States Patent [19]

Lindner et al.

[11] Patent Number: 4,668,268
[45] Date of Patent: May 26, 1987

[54] COATING HOOD WITH AIR FLOW GUIDE FOR MINIMIZING DEPOSITION OF COATING COMPOUND ON FINISH OF CONTAINERS

[75] Inventors: Georg H. Lindner, KV Vlissingen, Netherlands; Raymond W. Barkalow, Jackson, N.J.

[73] Assignee: M&T Chemicals Inc., Woodbridge, N.J.

[21] Appl. No.: 798,092

[22] Filed: Nov. 14, 1985

Related U.S. Application Data

[63] Continuation-in-part of Ser. No. 684,046, Dec. 20, 1984, abandoned.

[51] Int. Cl.⁴ .................. C23C 11/00; C23C 13/00
[52] U.S. Cl. ........................ 65/60.1; 65/60.2; 65/181; 118/312; 118/314; 118/720; 427/255.1; 427/255.3; 427/407.2
[58] Field of Search .............. 65/60.1, 60.2, 181; 118/312, 314, 720, 729; 427/255.1, 255, 255.3, 407.2

[56] References Cited

U.S. PATENT DOCUMENTS 3,623,854 11/1971 Frank .................................. 427/255
3,688,737 9/1972 Augustsson et al. ................ 118/720
4,220,118 9/1980 Levene et al. ....................... 118/720
4,389,234 6/1983 Lindner ............................... 65/60.1
4,431,692 2/1984 Hofmann et al. .................... 65/60.2
4,529,627 7/1985 Zürbig ................................. 427/255.3

Primary Examiner—Arthur Kellogg
Attorney, Agent, or Firm—S. H. Parker; J. Matalon; R. E. Bright

[57] ABSTRACT

A coating hood for applying protective coatings to glass containers, includes a pair of spaced side walls; a supply of vaporized or atomized coating chemical in a carrier gas; a conveyor for transporting the glass containers to be coated longitudinally through the coating hood; a hood ceiling with a plurality of openings positioned at the level of the container finishes for supplying coating free air across the finish of the containers; the openings on one side of the containers are offset in the longitudinal direction of the hood with respect to the openings on the other side of the containers; each opening supplying an envelope of the coating free air across the finish of the containers such that lateral boundaries of the envelope of each opening on one side of the containers are substantially coincident with lateral boundaries of the envelopes of the offset and laterally adjacent openings on the other side of the containers; and a blower for supplying the coating free air to the openings.

16 Claims, 14 Drawing Figures

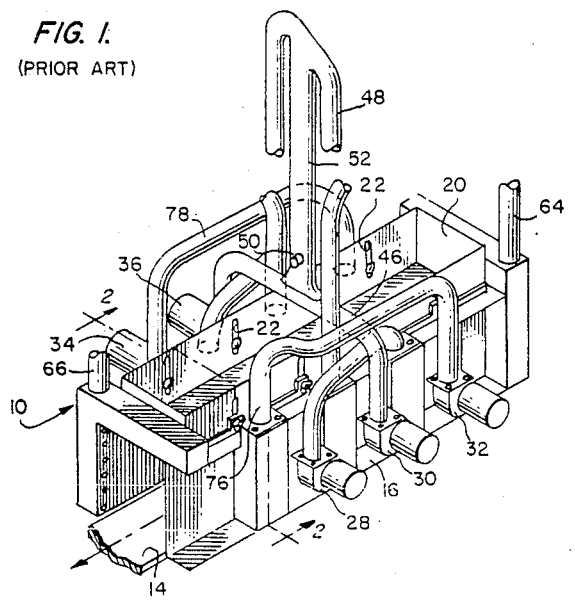
FIG. I.
(PRIOR ART)
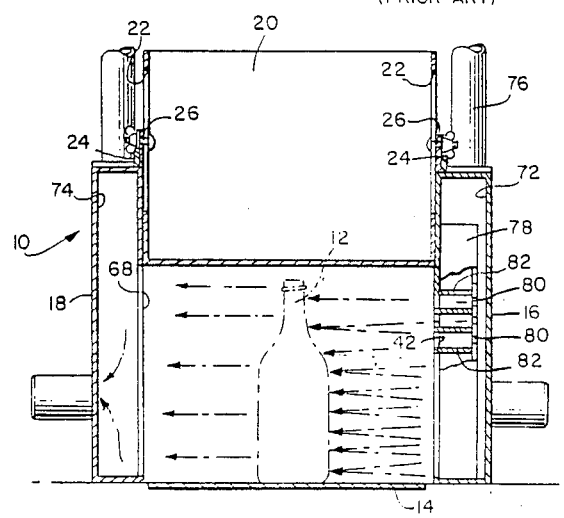
FIG. 2.
(PRIOR ART)

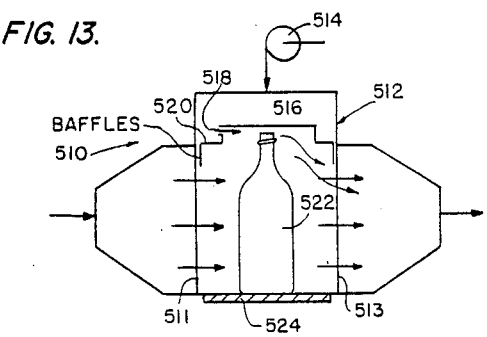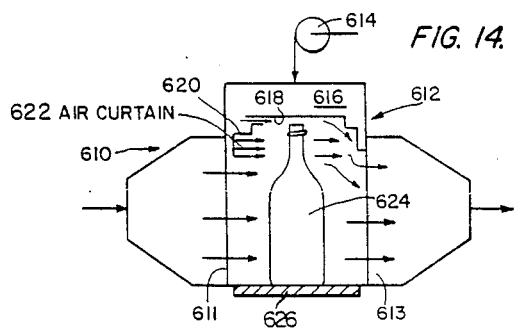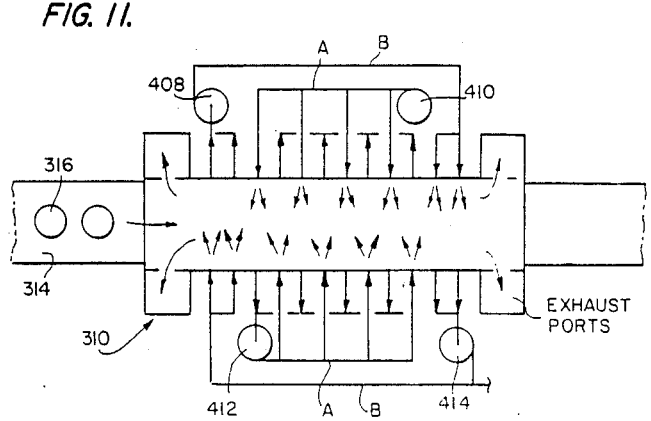

COATING HOOD WITH AIR FLOW GUIDE FOR MINIMIZING DEPOSITION OF COATING COMPOUND ON FINISH OF CONTAINERS

REFERENCE TO RELATED APPLICATION

This application is a continuation-in-part of U.S. patent application Ser. No. 06/684,046, entitled COATING HOOD WITH AIR FLOW GUIDE FOR MINIMIZING DEPOSITION OF COATING COMPOUND ON FINISH OF CONTAINERS, filed Dec. 20, 1984 now abandoned by the same inventors herein.

BACKGROUND OF THE INVENTION

The instant invention relates generally to a coating hood for applying a protective coating to hollow glass containers, and more particularly, to an air flow guide which directs streams of vapor free air over the finish of the containers to limit the accumulation of coating compound thereon.

The desirability of applying protective coatings to the exterior of hollow glass containers has long been recognized. Such coatings, which include tin, titanium, or other heat decomposable metallic compounds, or organometallic compounds, protect the glass containers from surface damage, such as abrasions and scratches, which result in a loss of tensile strength for the glass containers. The need for high-tensile strength in glass containers is particularly acute when containers are massproduced, move rapidly in close proximity along high-speed conveyor lines, and are subsequently filled with carbonated beverages, beer, wine, foodstuffs, and the like that produce gaseous pressure within the container.

Such protective coatings are usually applied as the glass containers emerge in a heated, fully-shaped condition from a glassware forming machine, that is, at the "hot end" of the system. The containers are transported away from the forming machine by a conveyor. Temperatures in excess of 400 degrees Centigrade exist at the surface of the glass containers, so that when a heat decomposable inorganic metallic, or organometallic, compound is applied thereto, the compound decomposes immediately and is converted to a metallic oxide coating.

One well-known and previously widely used technique for applying a protective coating to the hot glass containers calls for spraying the opposite sides of the containers as they travel on a conveyor, in single file, through two longitudinally spaced, oppositely positioned spray heads. Each spray head covers approximately 180 degrees of the circumference of the bottle, so that at least two spraying stations are required to coat the entire bottle. Receivers are positioned at the opposite side of the conveyor in alignment with the spray heads. Pressurized air with the coating compound entrained therein is discharged from each spray head at a significant pressure, while the receivers are usually maintained at a low pressure. The net pressure differential increases the velocity, and thus the effectiveness, of the coating compound. Coating systems of this nature are disclosed in U.S. Pat. No. 3,516,811, granted June 23, 1980, to G. L. Gatchet et al., and U.S. Pat. No. 3,684,469, granted Aug. 14, 1972 to W. C. Goetzer et al.

Gatchet et al. recognized that the deposition of a metallic oxide coating on the finish of the glass container passing on a conveyor through the open-sided coating apparatus was undesirable, as noted in column 3, lines 21–57. To control the location of the metal oxide deposit, as well as the uniformity of the deposit, Gatchet et al. relied upon spray heads producing a (theoretically) laminar flow that would pass laterally across the width of the conveyor, as shown in FIG. 4 of the patent.

The above-described coating systems, however, are "open-sided" and are thus adversely influenced by ambient conditions in the factory where the glass containers are formed. The ambient conditions of prime concern are rapidly moving air currents, the moisture in the air, and the potentially toxic and/or corrosive fumes and pollutants issuing from the spray heads. Air currents can cause turbulent conditions at the spray heads that will cause a preferential or uneven, application of the protective coating, and some of the coating will accumulate on the bottle finish. The rapidly moving air currents disrupt the laminar flow patterns that are theoretically possible with "open-sided" systems, and the capability of uniformly, and consistently, applying the same thickness of coating is severly reduced. To compensate for air currents, the above-described systems are operated at higher pressures, and with greater throughput of coating compound, than would be required under quiescent conditions. The moisture in this hostile atmosphere causes hydrolysis loss by rendering some of the compound unfit for its intended purpose. The escape of potentially toxic fumes into the atmosphere at the work place constitutes an occupational health hazard that may violate Federal, state and local ordinances. Also, the toxic fumes are highly corrosive and attack various components of the glass factory, such as the blowers, exhaust systems, conveyors, and even roofs, leading to increased plant maintenance costs. Furthermore, the efficiency of these "open-sided" systems is low, since much of the relatively expensive coating compound is wasted.

A second, well-known, and widely employed technique for applying a protective coating to hot glass containers relies upon a formed, sheet metal coating hood with spray heads and associated receivers situated therein. The coating hood obviates many of the problems associated with the open-ended spray systems discussed above. For example, the hood isolates the glass containers to be coated from the ambient conditions and furnishes a controlled atmosphere that enhances the coating operations. The hood includes an exhaust system which captures most of the air entrained coating compound that does not adhere to the containers, thus reducing the problems of venting the system and minimizing the opportunity for the coating compound to attack building components. Also, such hood can significantly raise the coating efficiency of the systems, with attendant cost savings.

Representative coating hoods are disclosed in U.S. Pat. No. 3,819,404, granted June 25, 1974 to Addison B. Scholes and Joseph J. Kozlowski, in U.S. Pat. No. 3,933,457, granted Jan. 20, 1976 to Addison B. Scholes, and in U.S. Pat. No. 4,389,234, granted June 21, 1983 to Georg H. Lindner, one of the co-inventors of the present application.

However, when a "hot end" coating is applied to glass containers, it is usually necessary to avoid depositing metal oxide coating on the upper part of the container including the neck and the threads; such area is commonly known as the finish of the container. Coating on the finish interferes with the application of a screw cap, lid, crown or the like to the container after the container has been filled. Additionally, the metal oxide coating on the finish may interact with the dissimilar metal of the cap, lid, crown, and the like to produce an unsightly corrosion problem or result in a high torque necessary for cap removal. Such corrosion problem, with its visual blemishes, is particularly acute since the coated glass containers are usually employed for beers, wines, soft drinks and foodstuffs, and the ultimate consumers will not purchase products even appearing to be tainted.

Still further, apart from the cap related problems, it is sometimes required that no coating be deposited inside the containers, particularly in medical and pharmaceutical applications. This, however, requires a coating system which completely avoids contact between the coating compound and the bottle finish. This requirement, however, has not been met with conventional types of coating systems. Therefore, because it is difficult to coat the main body of the container without coating the finish, it has been generally accepted that a coating thickness on the finish can be one-third that on the main body.

The aforementioned Lindner patent relies upon the high velocity flow of air with entrained coating compound passing across the width of the coating chamber to coat the glass containers passing therethrough. As shown in FIGS. 6 and 7 of the Lindner patent, a baffle with specifically configured apertures and horizontally extending ribs produces a substantially even flow of air over the full height of the coating chamber. While the operation of such hood has been far superior to previously known coating hoods in almost every aspect of performance, coating compound is deposited on the finish of the containers passing through the hood. Thus, this hood is only suitable for coating containers on which finish protection is of no concern.

At least one other known coating hood has also recognized the desirability of minimizing, if not preventing, the deposition of coating compound on the finish of the containers being coated, but have not realized this objective. While these other coating hoods have not even approached the Lindner coating hood in performance, they are discussed hereinafter to present a complete picture of the state of the art prior to the instant invention.

Another known coating hood is shown in U.S. Pat. No. Re. 28,076, granted July 16, 1974 to B.O. Augustsson and R. S. Southwick. FIG. 2 of the Augustsson et al. patent, which is assigned to the Glass Container Manufacturers Institute, Inc. New York, N.Y., shows a coating hood employing a horizontal barrier in each chamber in both side walls to divide each coating chamber into an upper chamber and a lower chamber of approximately equal dimensions. A stream of air with coating compound entrained therein is discharged from jet slots or nozzles in the lower chamber to coat the body of the glass bottle passing thereby; and the air stream with the unused coating compound passes into the lower chamber defined in the opposite side wall of the hood and is recirculated in a continuous manner.

A separate, distinct stream of fresh air, free from the vapor of the coating compound, is blown through the upper chamber in one side wall and is exhausted through the upper chamber in the opposing side wall, and through the top of the hood in a single pass. Both streams of air pass across the lateral extent of the coating hood in the same direction, and at high velocities.

The upper stream of fresh air is intended to keep the coating compound in the lower stream of air from reaching the container finish. However, under the hostile operating conditions experienced in glass manufacturing plants, the two streams of air intermix to a certain extent and have proven incapable of consistently keeping the coating compound removed from the container finish. It was found in actual tests that there was a coating thickness of approximately 12 CTUs (coating thickness units) on the finish with this hood. A CTU is a well known measure of the thickness of the coating by the American Glass Research Institute of Butler, Pa. This corresponded to a thickness on the finish of approximately 30% of the coating thickness on the main body of the container. Even employing higher flow velocities in the upper vapor free air stream failed to consistently keep the coating compound from being deposited on the finish of the container. Such increased flow velocities also provide an increase in the amount of fresh air that is used, which results in an excessive usage of coating compound. In addition, only part of the hood length, in the direction of travel of the containers, is provided with the fresh air streams for finish protection, further increasing the amount of coating compound deposited on the finish of the containers.

In addition to the aforementioned coating hoods shown in the patents to Augustsson et al and Lindner, the corporate assignee of Lindner has attempted providing the Lindner hood with an inverted U-shape to allow the neck of the bottle to pass therethrough. Fresh air was blown from rows of holes in the sides of the inverted U-shaped roof to the neck of the bottle, as schematically shown in FIG. 5. In such hood, however, the two streams intermix and cause a marked decrease in the deposition rate of the coating compound. It was found that, with such hood, the coating on the finish had a thickness generally one-third that of the thickness of the coating on the main body of the container, which is clearly undesirable. This was due to the finish air mixing with the coating air, whereby the coating compound was applied to the finish of the containers. Further, due to the dilution of the coating air with the finish air, the consumption of coating compound increased by as much as 20% to maintain the required coating thickness on the main body of the container.

The foregoing coating hoods, particularly the Lindner coating hood, performed satisfactorily under most operating conditions, but did not realize the desirable objective of minimizing, if not completely avoiding, the deposition of coating compound on the finish of the containers being coated. Such objective, if achieved, would eliminate the amount of coating on the finish without increasing the compound used per container. Furthermore, the absence of coating compound on the finish of each container avoids unsightly corrosion problems when caps are applied to the containers, while the strength of the container is retained undiminished. Also, if such objective could be achieved without using an inordinate number of blowers to force the air across the coating chamber, a relatively inexpensive and easy to operate coating hood could be realized.

OBJECTS AND SUMMARY OF THE INVENTION

With the deficiencies of known coating hoods clearly in mind, the instant invention presents simple air flow guides for effectively separating the vapor free finish air stream from the air stream with the coating compound entrained therein. The finish air stream is constituted by a relatively small volume of vapor free air, while the air streams with the coating compound entrained therein is constituted by a relatively large volume of high velocity air. The air flow guides are operatively associated with side walls of the coating hood so that the finish air stream enters the chamber spaced above, and separated from, the air stream with the coating compound entrained therein. The lateral dimensions at the upper end of the coating hood are reduced by the configuration of the air flow guide so that the finish air stream minimizes the deposition of coating compound on the finish of the containers. The foregoing factors contribute to the realization of a coating hood wherein the two air streams are effectively separated, the intermixing of the air streams is reduced, and the coating hood performs more effectively and at a lower cost per coated container.

The finish air stream is directed at the finish of the containers by a plurality of air flow guides or tunnels. The finish air flow guides are operatively associated with, spaced above, and separated by a distance of from 2-8 cm from, the coating air jet slots that direct a high velocity stream of air with coating compound entrained therein against the body of a container. The flow guides are also operatively associated with the exhaust ports of the coating hood.

It is important to the present invention that, in addition to the finish air flow guides being separated from the coating air guides, the finish air streams are blown across the finish of the containers in a specific configuration. Specifically, it is important that the finish air jets on both sides of the coating hood be provided in alternating sequence, that is, finish air jets on one side being offset in the direction of travel of the containers from the finish air jets on the other side. Thus, since the air from the finish air jets emerges at a diverging angle, the finish air jets form an envelope with lateral boundaries, with the lateral boundaries of one envelope on one side being substantially coincident with the lateral boundaries of the two laterally offset and adjacent boundaries on the other side of the coating hood.

As a result, a quiet zone between two finish air jets blowing from one side is completely filled with moving air from one of the opposing finish air jets blowing from the other side, without interference between the opposing finish air jets. This means that intermixing of the finish air jets at the lateral boundaries of the envelopes thereof only occurs with other finish air jets, since there is no quiet zone which can be reached by a coating air jet. Thus, only the lower boundary of each finish air jet is in contact with the coating air jets in the lower part of the hood, so that intermixing of the coating air with the finish air is minimized and the finish air contacting the container finish is effectively free of coating compound. In addition, there is no effective increase in the amount of coating compound consumed.

Any intermixing of the coating air and finish air at the lower part of the finish air curtain is further minimized due to the fact that the finish air jets and coating air jets are separated by a distance of from 2-8 cm, whereby a further separation at the lower boundary of the finish air curtain results.

The instant coating hood, with its air flow guide, achieves operating economies not realized by known coating hoods. Manifestly, every increment in coating efficiency translates into material savings with high speed, mass production glass coating operations.

Furthermore, the air flow guide includes a roof with depending spaced side walls, and a stepped underside that terminates in an inner top wall. The inner top wall reduces the height of the coating hood, while the stepped underside reduces the width thereof. These factors contribute to the effectiveness of the hood.

The air flow guide may be adjusted vertically relative to the side walls of the coating hood, so that containers of different heights can be effectively coated while the accumulation of coating compound on the finish of the container is minimized. The air flow guide may also be formed in different widths for securement between the side walls of the coating hood, thus enabling efficient coating operations with containers of different widths.

The air flow guide not only limits the deposition of coating compound on the finish of the container being coated, but the guide precludes the accumulation of any coating within the interior of the container. This capability is particularly significant when manufacturing containers for medical purposes, and sanitary standards of the highest order must be observed.

Lastly, the air flow guide functions in harmony with existing spray hoods, and is compatible with spray hoods that utilize recirculating loops for enhanced performance.

Numerous other operational advantages attributable to the instant coating hood with its unique configuration for realizing distinct air flow patterns will become apparent to the skilled artisan from the ensuing description when construed in harmony with the appended drawings.

BRIEF DESCRIPTION OF THE DRAWINGS

FIG. 1 is a perspective view of a first conventional coating hood;

FIG. 2 is a vertical cross-sectional view of the coating hood of FIG. 1, such view being taken along line 2—2 in FIG. 1 and in the direction indicated;

FIG. 11 is a schematic view of the an alternative flow pattern for the high velocity air (with the coating compound entrained therein)

FIG. 13 is a schematic view of a second alternative embodiment of the air flow guide of FIGS. 6-11; and FIG. 14 is a schematic view of a third alternative embodiment of the air flow guide of FIGS. 6-11.

DETAILED DESCRIPTION OF THE PREFERRED EMBODIMENTS

Figure 3:
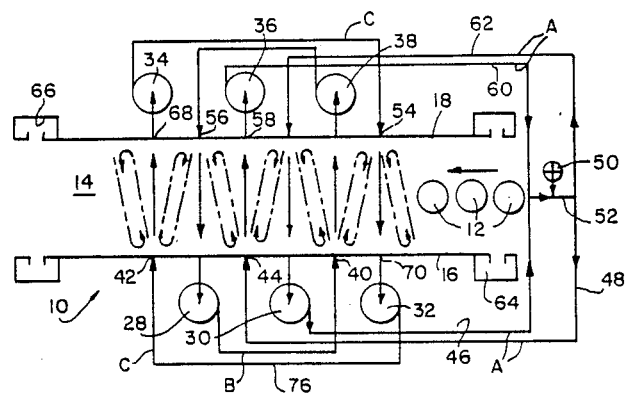
FIG. 3 is a schematic view of the recirculating flow paths established within the coating hood of FIG. 1.

FIGS. 1-3 illustrate the essential aspects of the coating hood disclosed in detail in U.S. Pat. No. 4,389,234, granted June 21, 1983, to Georg H. Lindner, and assigned to M&T Chemicals, Inc. of Woodbridge, N.J., the assignee of the instant application. Such coating hood is briefly described hereinafter.

The coating hood is identified generally by reference numeral 10, and glass containers 12 to be coated are moved through the interior of the hood by conveyor 14. Hood 10 includes spaced side walls 16, 18, and an upwardly opening rectangular roof 20 extends laterally across the good. Slots 22 are formed in the roof, and ears 24 are situated at the upper end of each side wall. Fasteners 26 extend through ears 24 and into the slots so that the roof 20 may be adjusted vertically relative to the side walls, thus allowing the hood to accommodate glass containers of different heights.

Side wall 16 is divided into six distinct chambers by vertically extending interior partitions (not shown), and side wall 18 is divided in a similar fashion. Blowers 28, 30 and 32 are secured to side wall 16, and blowers 34, 36 and 38 are secured to the opposite side wall.

Jet slots 40 and 42 are formed in side wall 16 to discharge the high velocity flow from blowers 28 and 32, respectively. Jet slot 44 is formed in side wall 16 to discharge the high velocity flow, while conduits 46, 48 lead the high velocity flow past feedpoint 50 in control leg 52 before returning to jet slot 44. The coating compound to be applied to the glass containers is introduced into the hood at feedpoint 50.

Jet slots 54 and 56 are formed in side wall 18 to discharge the high velocity flow from blowers 34 and 38, respectively. Jet slot 58 is formed in side wall 18 to discharge the high velocity flow from blower 36, while conduits 60, 62 lead the high velocity flow past feedpoint 50 in central leg 52 before returning to jet slot 58. An exhaust port 64 is located at the entrance of the coating hood, and another exhaust port 66 is located at the exit of the coating hood.

A receiver slot is formed in the side wall opposite each jet slot, as indicated in FIG. 3. For example, receiver slot 68 is formed in the inner face of side wall 18 opposite jet slot 42, and receiver slot 70 is formed in the inner face of side wall 16 opposite jet slot 54. Receiver slot 68 allows the high velocity air traversing the width of the coating hood to flow into the intake side of blower 34, while receiver slot 70 allows the high velocity air traversing the coating hood to flow into the intake side of blower 32. By the judicious placement of jet slots and receiver slots, coating hood 10 produces three separate recirculating loops, or flow paths, for the high velocity air (with coating compound entrained therein) passing therethrough. The loops are identified as loops A, B and C in FIG. 3. Loop A is the innermost recirculating loop, loop B is the intermediate recirculating loop, and loop C is the outermost recirculating loop. The coating compound is introduced into loop A at feedpoint 50, and eddy currents transfer the coating compound to the outer loops B and C, though at reduced concentrations. The glass containers 12 passing through the coating hood are thus coated repeatedly, and in opposing directions, by the coating compound entrained in the high velocity air streams. The recirculating loops have greatly enhanced the performance of coating hood 10 while significantly reducing the consumption of coating compound.

FIG. 2 reveals that the side walls 16, 18 of coating hood 10 are divided into separate chambers. Chambers 72 and 74 are representative of these chambers. Jet slot 42 is located in the interior face of chamber 72, and receiver slot 68 is located in the interior face of chamber 74. The high velocity air is introduced into chamber 72 via conduit 76 leading from blower 32. After passing across the width of the good and entering chamber 74, the high velocity air is drawn into the intake side of blower 34.

A baffle 78 is situated in the chamber 72 so that the high velocity air must flow therethrough prior to passing through jet slot 42. Several apertures 80 are formed through the rear wall of the baffle, and the apertures cooperate with horizontally extending ribs 82 to divide the air stream into several vertically spaced, streams. The streams, which have coating compound entrained therein, efficiently coat the glass containers passing thereby. While the baffle may be configured to direct the streams principally against the body of the container to be coated, as suggested by the flow arrows in FIG. 2, a significant fraction of the coating inevitably accumulates on the finish of the glass containers. Thus, this hood is only suitable for coating containers on which finish protection is of no concern.

Figure 4:
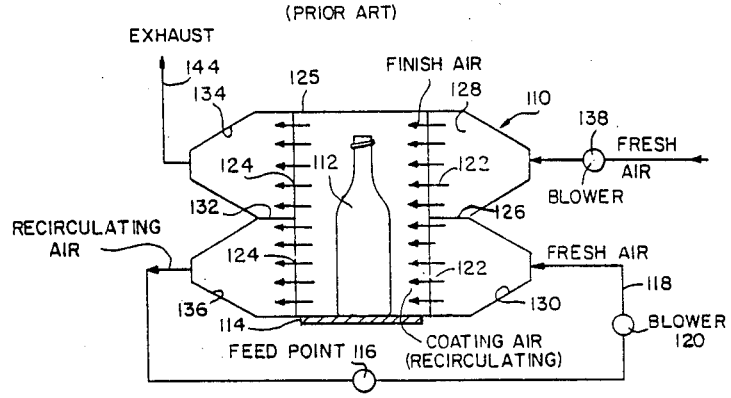
FIG. 4 is a schematic view of a second conventional coating hood.

While FIGS. 1-3 depict the coating hood disclosed in U.S. Pat. No. 4,389,234, FIG. 4 schematically represents the known coating hood disclosed in U.S. Pat. No. Re. 28,076, granted July 16, 1974 to B. O. Augustsson et al. and assigned, on its face, to Glass Container Manufacturers Institute, Inc., New York, N.Y. While a brief description of the Augustsson et al. coating hood is set forth in the succeeding paragraphs, a comprehensive description can be gleaned from the cited Reissue patent.

FIG. 4 schematically represents this second, well-known coating hood, indicated generally by reference numeral 110, for coating glass containers at the "hot end" of a glass manufacture line. The containers 112, while at a temperature of 400 degrees Centigrade or more, are transported, in single file, by a conveyor 114 through a tunnel formed in the hood 110. Coating compound is introduced into the hood at a feedpoint 116, and the coating compound is combined in line 118 with pressurized air from a first blower 120. The entrained coating compound is discharged through a plurality of slots 122, or nozzles, against one side of the container passing thereby. Receiver slots 124 are aligned with the slots 122 and capture the unused coating compound that has not adhered to the container. The coating compound is recirculated past feedpoint 116 to slots 122 for application to the next container passing thereby. The jet slots 122 and the receiver slots 124 extend vertically from the base to the roof 125 of the hood 110.

A horizontal partition 126 divides the inlet side of the coating hood 110 into an upper inlet chamber 128 and a lower inlet chamber 130. Similarly, a horizontal partition 132 divides the outlet side of the coating hood into an upper outlet chamber 134 and a lower outlet chamber 136. The flow path for the lower, recirculating air flow with entrained coating compound traverses chambers 130 and 136.

A second, single pass air flow path is defined above partitions 126 and 132. Such flow path marks the directions of travel for fresh, vapor free air traveling across the lateral extent of the hood 110. A second blower 138 draws in fresh air and discharges the same from chamber 128 through the slots 122 situated above the partition 126. The air passes across the finish of container 112 and is captured in the aligned receiver slots 124 above partition 132, leading into chamber 134. The pressurized air passes through chamber 134 and is exhausted to atmosphere over vent line 144. The flow of the recirculating air with coating compound is indicated by directional arrows; the flow of the single pass air streams is similarly indicated.

Figure 5:
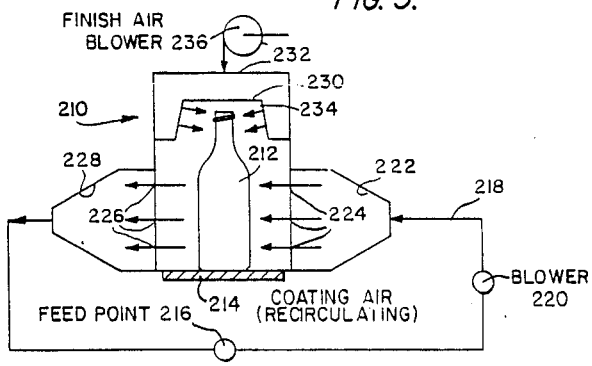
FIG. 5 is a schematic view of a modification to the coating hood of FIG. 1.
Figure 12:
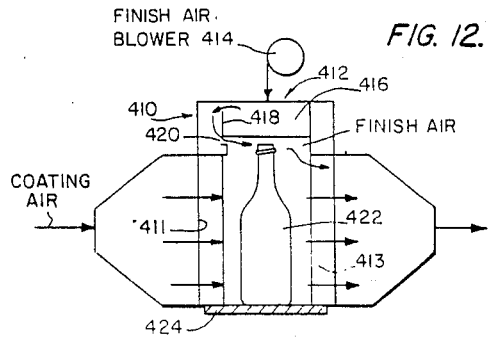
FIG. 12 is a schematic view of a first alternative embodiment of the air flow guide of FIGS. 6-11.

It was found in actual tests that there was a coating thickness of approximately 12 CTUs (coating thickness units) on the finish with this hood. A CTU is a well known measure of the thickness of the coating by the American Glass Research Institute of Butler, Pa. This corresponded to a thickness on the finish of approximately 25-30% of the coating thickness on the main body of the container. Even employing higher flow velocities in the upper vapor free air stream failed to consistently keep the coating compound from being deposited on the finish of the container. Such increased flow velocities also provide an increase in the amount of fresh air that is used, which results in an excessive usage of coating compound. In addition, only part of the hood length, in the direction of travel of the containers, is provided with the fresh air streams for finish protection, further increasing the amount of coating compound deposited on the finish of the containers. In initial attempts to prevent coating the bottle finish, the corporate assignee of Lindner provided the Lindner hood with an inverted U-shaped top, as schematically shown in FIG. 5, with the coating hood being indicated generally by reference numeral 210. As shown, the containers 212, while at a temperature of 400 degrees Centigrade or more, are transported by a conveyor 214 through a tunnel formed in the hood 210. Coating compound is introduced into the hood at feedpoint 216, and the coating compound is combined in line 218 with pressurized air from blower 220. The entrained coating compound passes through inlet chamber 222 situated in one side wall of the hood, and is discharged through vertically spaced slots 224, or nozzles, against the container passing thereby. Some of the coating compound adheres to the container, while the unused compound passes through aligned receiver slots 226 into outlet chamber 228. The coating compound is then recirculated through line 218 for application to succeeding containers. Additional coating compound is introduced, when and if needed, through feedpoint 216 to maintain the efficiency of the coating process. The flow path for the coating compound is suggested by the directional arrows.

In an effort to minimize the deposition of coating compound on the finish of the bottle, an inverted U-shaped insert 230 was situated within the hood 210 below roof 232. Apertures 234 are defined in the walls of the insert, and a second blower 236 forces finish air through the apertures. The paths of travel for the oppositely directed finish air streams are suggested by the directional arrows at the upper end of the spray hood 210.

The finish air streams, however, have been found to intermix with, and dilute, the major stream of air with coating compound entrained therein. The intermixing and dilution of the major stream causes a decrease in the deposition rate for the coating. In order to compensate for this decrease, additional amounts of relatively costly coating compound must be used under actual operating conditions.

It was found that, with such hood, the coating on the finish had a thickness generally one-third that of the thickness of the coating on the main body of the container, which is clearly undesirable. This was due to the finish air mixing with the coating air, whereby the coating compound was applied to the finish of the containers. Further, due to the dilution of the coating air with the finish air, the consumption of coating compound increased by as much as 20% to maintain the required coating thickness on the main body of the container.

Figure 8:
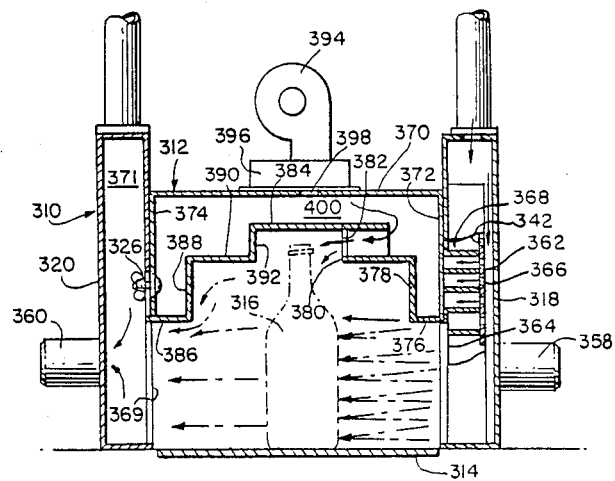
FIG. 8 is a vertical cross-sectional view through the coating hood of FIG. 6.
Figure 6:
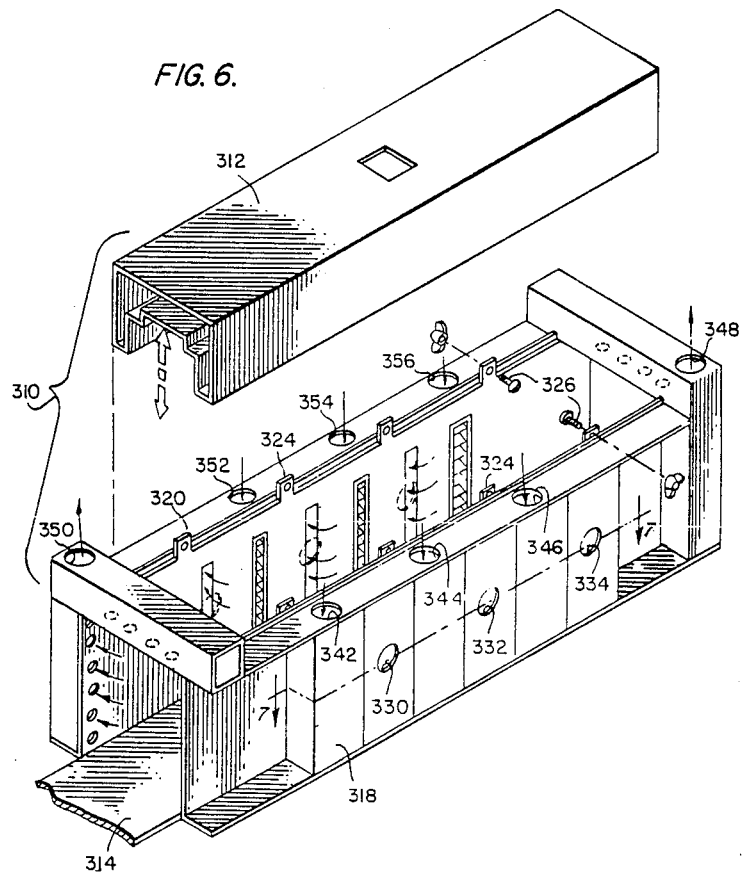
FIG. 6 is an exploded perspective view of a coating hood employing an air flow guide constructed in accordance with the principles of this invention.
Figure 7:
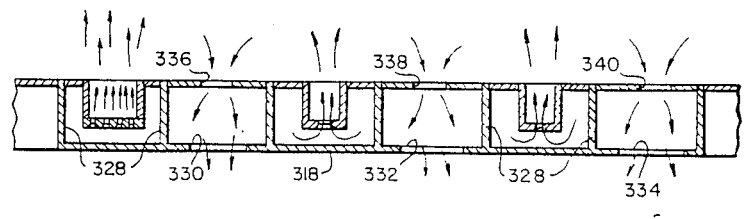
FIG. 7 is a fragmentary, horizontal cross-sectional view through a side wall of the coating hood of FIG. 6, such view being taken along line 7—7 and in the direction indicated.
Figure 10:
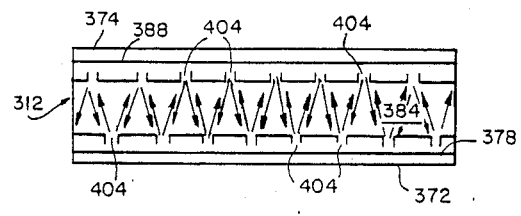
FIG. 10 is a schematic view of the flow paths for the finish air established within the coating hood of FIGS. 6-9.
Figure 9:
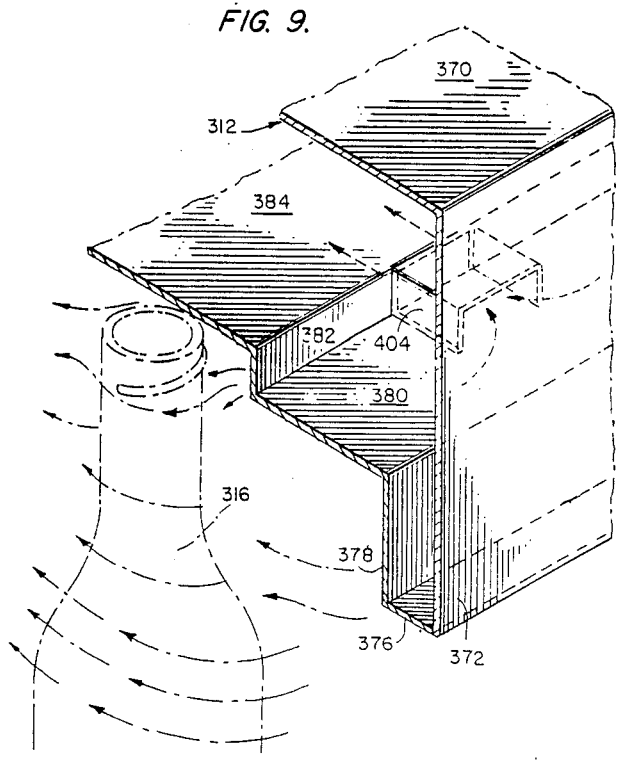
FIG. 9 is a fragmentary, perspective view of the air flow guide, such view being taken on an enlarged scale.

Referring now to FIGS. 6-8, there is shown a coating hood 310 employing an air flow guide 312 constructed in accordance with the principles of the instant invention. Coating hood 310 is similar in structural detail and operational characteristics to coating hood 10 described briefly above, and described in detail in U.S. Pat. No. 4,389,234. However, the upwardly opening rectangular roof 20 of coating hood 10 has been replaced by a unique air flow guide 312, with numerous attendant advantages that will become apparent hereinafter. It will be appreciated from the discussion which follows, however, that the present invention is not limited to this particular coating hood which is merely described in order to better illustrate the present invention; but rather, has wide applicability to any of the above prior art (and other) coating hoods.

A conveyor 314 advance glass containers 316 longitudinally, and in single file, through the interior of the hood. Hood 310 includes spaced side walls 318, 320, and the air flow guide 312 extends laterally therebetween. Ears 324 are situated in the upper end of each side wall. Fasteners 326 extend through ears 324 into the slots so that the guide may be adjusted vertically relative to the side walls, thus allowing the hood to accommodate glass containers of different heights.

Side wall 318 is divided into six distinct chambers by vertically extending interior position walls 328, visible in FIG. 7. Three blowers (not shown in FIGS. 6 and 7) are secured to side wall 318. The inlet, or low pressure side, of a first blower is connected to the aperture 330 in the second chamber of the side wall 318. The inlet of a second blower is connected to the aperture 332 in the fourth chamber of the side wall 318, and the inlet of a third blower is connected to the aperture 334 in the sixth chamber of the side wall 318. Apertures 330, 332 and 334 are aligned with receiver slots 336, 338 and 340, respectively, as shown in FIG. 7. The first, third, and fifth chambers receive high velocity air streams from other blowers through inlet ports 342, 344, 346 and discharge such streams across the width of the coating hood. An exhaust port 348 is situated at the entrance to coating hood 310, and a second exhaust port 350 is situated at the exit from the coating hood.

Side wall 320 is divided into six distinct chambers in a similar manner. Three blowers (also not shown) are secured to side wall 320. High velocity streams of air are introduced into the second, fourth, and sixth chambers in side wall 320 by inlet ports 352, 354 and 356. The paths of movement for the various air streams flowing through coating hood 310 are indicated by directional arrows. It is noted that the blower and related conduits have been omitted in order to enhance the clarity of the remaining components.

FIG. 8 is a vertical cross-sectional view through coating hood 310 showing a representative chamber, such as the first chamber in side wall 318. One of the motors 358 which drives one of the three blowers secured to side wall 318 is visible at one side of the hood, while one of the motors 360 which drives one of the three blowers secured to side wall 320 is visible at the opposite side of the hood. High velocity air enters the chamber through inlet port 342, flows downwardly through baffle 362 before passing through jet slot 364 into the interior of coating hood 310. Apertures 366 in the baffle are larger at their entrance than at their exit, and ribs 368 coact with the apertures to enhance the flow uniformity of the high velocity air stream. The flow passes across the coating hood and enters receiver slot 369 defined at the entrance to the first chamber 371 in side wall 320. The compound is introduced into the air stream at a feedpoint (not shown). The side wall of air flow guide 312 covers the upper end of the jet slot 364 and blocks passage of the high velocity air stream therethrough.

Air flow guide 312 fits between side walls 318, 320 and completes the coating hood 310. The guide can be adjusted vertically so that glass containers of different heights can be coated. Also, the flow guides can be formed in different widths, so that the lateral dimension of the coating hood can be adjusted to accommodate containers of greater, or less, widths.

As shown in FIG. 8, air flow guide 312 includes a horizontal roof 370, a first depending side wall 372, and a second depending side wall 374. A horizontal step 376 extends inwardly from side wall 372, and a vertical riser 378 extends upwardly therefrom toward a larger step 380. A second riser 382 extends upwardly above step 380, and an inner top wall 384 extends across the middle of the coating hood toward depending side wall 374.

A horizontal step 386 extends inwardly from side wall 374, and a vertical riser 388 extends upwardly therefrom toward a larger step 390. Another riser 392 extends upwardly above step 390, and the top wall 384 joins spaced risers 382 and 392. The stepped underside of guide 312 reduces the width across the upper end of the hood.

A blower 394 is secured to a pedestal 396 secured to the upper surface of the flow guide. Blower 394 furnishes finish air through aperture 398 to the plenum 400 defined within the interior of the flow guide.

The high velocity stream of air with coating compound entrained therein from jet slot 364 to receiver slot 369 is indicated by the directional arrows shown in FIG. 8. Baffle 362 enhances the flow characteristics of the stream of air, and improves the uniformity, and reproducibility, of the coating applied to the body of the glass containers 316. The air flow guide 312 introduces a much smaller, low velocity stream of finish air into the upper end of the coating hood 310; the finish air being supplied by blower 394. The configuration of the underside of the air flow guide reduces the lateral internal dimension of the coating hood in the vicinity of the finish of the glass containers passing therethrough. Consequently, although the vapor free finish air supplied by blower 394 may be furnished at a reduced volume, and even at a lower velocity than the air flow exiting jet slot 364, the finish air minimizes the unwanted deposition and/or accumulation of coating compound on the threads and neck of the glass containers. Simultaneously, the finish air flow does not interfere with the coating being applied to the body of each container. The finish air functions as an effective internal air curtain, and intermixing between the vapor free finish air and the high velocity air stream with the coating compound entrained therein is minimal, as will now be described in greater detail. The flow patterns for the finish air, and the high velocity air stream, are indicated by directional arrows in FIG. 8. The two separated flows are combined after passing through receiver slot 369 into chamber 371, and are recirculated through appropriate conduits for coating additional containers 316.

Specifically, FIG. 9 is a perspective view of a fragment of air flow guide 312, such view being taken on an enlarged scale to better depict selected structural features of the guide 312. Blower 394 introduces a stream of finish air, that is, without any coating compound contained therein, into chamber 400 defined in the interior of guide 312. The air is routed through U-shaped tunnels 404 and passes over the threads on the upper end of the neck of container 316. The vapor free air passing through tunnels 404 preferably travels in the same direction as the flow of the high velocity air streams passing over the body of container 316, although the directions of travel may be opposite to each other, and in the case of other types of coating hoods may have no relation to each other at all.

FIG. 10 schematically shows that a plurality of tunnels 404 are defined in risers 382, 392, but the tunnels are offset relative to each other, as will be explained in more detail below. In addition, it is important that tunnels 404 substantially extend along the entire length of the hood. Each tunnel 404 is preferably disposed above a jet slot defined in the side walls 318, 320 of the hood 310, and the tunnels 404 therefore preferably direct finish air flow in the same direction as the jet slots direct the high velocity air stream with the coating compound contained therein. As an example, tunnels 404 may each have a width (in the direction of travel of the containers) of approximately 0–5 cm (preferably 2–4 cm) and a height of approximately 0.5–2 cm.

It is important to the present invention that tunnels 404 are separated from the coating air slots 364, whereby the finish air streams are blown across the finish of the containers in a specific configuration. Specifically, it is important that the finish air jets exiting from tunnels 404 on both sides of the coating hood be provided in alternating sequence, as shown in FIG. 10, that is, finish air jets on one side being offset in the direction of travel of the containers from the finish air jets on the other side. Thus, since the air from the finish air jets emerges at a diverging angle, the finish air jets form an envelope with lateral boundaries, with the lateral boundaries of one envelope on one side being substantially coincident with the lateral boundaries of the two laterally offset and adjacent boundaries on the other side of the coating hood. At an initial jet speed of some 2 to 4 m/sec., the enveloping jet angle was found to be close to 20 degrees.

As a result, a quiet zone between two finish air jets blowing from one side is completely filled with moving air from one of the opposing finish air jets blowing from the other side, without interference between the opposing finish air jets. This means that intermixing of the finish air jets at the lateral boundaries of the envelopes thereof only occurs with other finish air jets, since there is no quiet zone which can be reached by a coating air jet. Thus, each finish air jet is only in contact with the coating air in the lower part of the hood, that is, at the lower part of the finish air curtain, so that intermixing of the coating air with the finish air is minimized and the finish air contacting the container finish is effectively free of coating compound. In addition, there is no effective increase in the amount of coating compound consumed.

In order to further minimize any intermixing of the finish air and coating air, tunnels 404 are spaced above and separated from the upper end of the jet slots 364 discharging the high velocity air stream containing the coating compound. The vertical spacing pattern improves the efficiency of the finish air stream and further reduces and/or minimizes the undesirable accumulation of coating compound on the threads and neck of containers 316. Specifically, tunnels 404 are situated from approximately 2-8 cm above the coating jet slots 364 through which the coating air enters the hood. This separation can be effected by side walls 372, 374 and with risers 378, 388 having a height of approximately 2-8 cm, thereby providing a blocking skirt for the coating air jets.

In order to further minimize intermixing of the finish air and coating air, the hood is inwardly displaced as a result of steps 376, 380, 386, 390 and risers 378, 382, 388, 392, with tunnels 404 being provided in risers 382, 392, as shown. Thus, the finish air has to travel over a smaller distance than the coating air before it reaches the containers, so that it is less likely that the finish air will be contaminated by the coating air. It will be noted that, in general, the finish of a container is approximately 4–7 cm smaller in diameter than the main body of the container. Therefore, the hood wall may be inwardly displaced by the aforementioned steps and risers over a distance of approximately 2-3.5 cm, that is, approximately one-half of the difference in diameters, without causing a restriction to the passage of the containers through the hood. This is important taking into consideration various misalignment encountered in normal plant operation.

FIG. 11 schematically shows the manner in which high velocity air, with coating compound entrained therein, may be applied to containers 316 passing through coating hood 310. Blowers 408, 410, 412 and 414 are interconnected by aligned jet slots and receiver slots in opposing side walls 318, 320 to define an inner, high velocity recirculating loop A and an outer, lower velocity recirculating loop B. The coating compound is introduced into loop A and is gradually transferred to loop B by eddy currents, intermixing streams, and the like. The recirculating loops, per se, are discussed in considerable detail in U.S. Pat. No. 4,389,234, and do not form a part of the instant invention.

FIG. 12 schematically depicts a coating hood 410 that includes side walls 411, 413 and utilizes a first alternative embodiment of air flow guide 412. A finish air blower 414 is situated atop guide 412, and the output from the blower flows into a chamber 416 defined within the guide 412 between the roof and the inner top wall. The vapor free finish air flows over barrier 418 and then enters the upper end of hood 410 through openings 420 situated above one of the side walls of the hood. The flow of finish air effectively confines the high velocity air stream with entrained coating compound to the body of the container, so that coating compound is not deposited on the finish of glass container 422. The containers 422 are advance through coating hood 410, in single file, by conveyor 424. The flow patterns established within coating hood 410 are indicated by the directional arrows shown in FIG. 12. Openings 420 are spaced in an alternating sequence as shown in FIG. 10.

FIG. 13 schematically depicts a coating hood 510 that includes side walls 511, 513 and utilizes a second alternative embodiment of air flow guide 512. A finish air blower 514 is situated atop guide 512, and the output from the blower flows into a chamber 516 defined within the guide 512 between the roof and the inner top wall. The vapor free finish air flows into openings 518 defined between the upper end of baffles 520 and the lower surface of guide 512. The baffles 520 are configured to reduce the lateral dimension of the coating hood at the upper end of the chamber. The flow of finish air confines the high velocity air stream with entrained coating compound to the body of the container 522. Conveyor 524 advances the containers 522 through the coating hood. The flow patterns established within coating hood 510 are indicated by the directional arrows in FIG. 13. Openings 520 are spaced in an alternating sequence as shown in FIG. 10.

FIG. 14 schematically depicts a coating hood 610 that includes side walls 611, 613 and utilizes a third alternative embodiment of air flow guide 612. A finish air blower 614 is situated atop guide 612, and the output from the blower flows into a chamber 616 defined within the guide 612 between the roof and the inner top wall. The vapor free finish air flows into openings 618 defined between the upper end of baffles 620 and the lower surface of guide 612. The baffles 620 reduce the lateral dimension of the coating hood at the upper end of the chamber. Small barriers 622 define an air curtain spaced vertically below the outer two openings 618. At each hood end the finish air passing through openings 618 and barriers 622 flows over the threads and neck of the containers, respectively, and confines the high velocity air stream with entrained coating compound to the body of the containers 624. The containers 624 are advanced through the coating hood, in single file, by conveyor 626. The flow patterns established within coating hood 610 are indicated by the directional arrows shown in FIG. 14. Again, openings 620 are formed in the same alternating sequence as shown in FIG. 10.

It should be noted in the air flow guides depicted in FIGS. 6–14 that the vapor free finish air enters the upper end of the coating chamber a small distance below the level of the inner top wall. Actual usage in the field has demonstrated that the finish air entrance, be it through a tunnel, baffle, air curtain, slit, or other opening, should be spaced approximately 0–1 cm below the inner top wall for maximum effectiveness.

With the system according to the present invention, tests have shown that the thickness of the coating on the finish is approximately 0–3 CTUs (coating thickness units) when the thickness of the coating on the main body is approximately 35 CTUs. A CTU is a conventional measure of the thickness of the coating by the American Glass Research Institute of Butler, Pa. This was measured with a finish air speed of only 2 m/sec., as measured in tunnels 404. Further, with these tests, the effect of coating air dilution by finish air could not be detected in the coating chemical consumption. This is in stark contrast to a coating thickness on the finish which is one-third that on the main body, as in the prior art. Further, this was achieved with a supply of finish air from blower 394 at the rate of only 0.36 $m^3$/min. There were seven tunnels 404 on each side of the hood, each tunnel 404 having a height of 1 cm, a width of 2.5 cm, and being spaced from the roof by 0.8 cm. The hood length was 80 cm and the clearance between the container and the roof was 0.5 cm.

A preferred embodiment of air flow guide 312 for the coating hood 310 has been described in detail, and alternative embodiments of air flow guides 410, 510 and 610 have been described in lesser detail. The unique flow guides can be employed within coating hoods of different constructions, and may be used with hoods relying upon recirculating loops or with single pass flow paths. Manifestly, other changes in the shape of the air flow guides, the location of the slits, tunnels and openings, will occur to the skilled artisan. Thus, the appended claims should not be restricted to their literal terms, but should be broadly construed in a manner consistent with the breadth and scope of this significant improvement to existing coating hood technology.

What is claimed is:

1. A coating hood for applying uniform protective coatings to glass containers having a main body and a finish, said coating hood comprising:
   (a) a pair of spaced side walls;
   (b) at least one coating jet forming means defined in at least one side wall and extending to a height not greater than that of the main body of said glass containers for supplying a coating compound to the main body of said containers;
   (c) at least one receiver defined in at least one side wall, each receiver being situated in a side wall opposite to and in substantial alignment with a respective coating jet forming means in the opposite side wall for receiving an output therefrom;
   (d) at least one feedpoint for introducing a coating compound into said coating hood;
   (e) first blower means for delivering air to said coating jet forming means with the coating compound entrained therein, wherein the main body of said containers are coated with said coating compound;
   (f) means for transporting the glass containers to be coated longitudinally through said coating hood past said at least one coating jet forming means;
   (g) a plurality of finish air jet forming means positioned at a height above said coating jet forming means for supplying coating free air across the finish of said containers as the latter are transported through said coating hood;
   (h) said finish air jet forming means being vertically separated from said coating jet forming means by a distance of at least 2 cm;
   (i) said finish air jet forming means positioned on opposite sides of said containers, the finish air jet forming means on one side of said containers being offset in the longitudinal direction of said hood with respect to the finish air jet forming means on the other other side of the containers;
   (j) each said finish air jet forming means supplying an envelope of said coating free air across the finish of said containers such that lateral boundaries of the envelope of each finish air jet forming means on one side of said containers are substantially coincident with lateral boundaries of the envelopes of the offset and laterally adjacent finish air jet forming means on the other side of said containers; and
   (k) second blower means for supplying said coating free air to said finish air jet forming means.

2. A coating hood as defined in claim 1; wherein each said finish air jet forming means includes an opening having a substantially rectangular configuration such that the lateral boundaries of each envelope are substantially vertical.

3. A coating hood as defined in claim 1; further comprising an air flow guide secured between said side walls adjacent the upper end thereof, said air flow guide including a horizontal roof, first and second depending side walls, a stepped underside that terminates in a centrally located inner top wall spaced below said roof, and a chamber defined between said roof, depending side walls, stepped underside and top wall; and wherein said finish air jet forming means are formed in said stepped underside.

4. A coating hood as defined in claim 3; wherein said finish air jet forming means are spaced from said inner top wall of said air flow guide by a distance of approximately 0-1 cm.

5. A coating hood as defined in claim 1; wherein said finish air jet forming means are inwardly spaced toward said containers with respect to said coating jet forming means.

6. A coating hood as defined in claim 1; wherein there are a plurality of coating jet forming means, and said finish air jet forming means are located in vertical alignment with said coating jet forming means such that the flow of coating free air from said finish air jet forming means is in the same direction as the high velocity flow of air from said coating jet forming means.

7. A coating hood as defined in claim 1; wherein said finish air jet forming means is vertically separated from said coating jet forming means by a distance of approximately 2-8 cm.

8. A coating hood as defined in claim 1; wherein there are a plurality of finish air jet forming means on each side of said hood.

9. A method for applying uniform protective coatings to glass containers having a main body and a finish, said method comprising the steps of:
   (a) transporting the glass containers to be coated longitudinally through a coating hood;
   (b) supplying a coating compound to the main body of said containers as the latter are transported between side walls of said coating hood by at least one coating jet forming means defined in at least one side wall of said coating hood and extending to a height not greater than that of the main body of said glass containers;
   (c) receiving a residual output of said coating material remaining after the main bodies of said glass containers have been coated by at least one receiver defined in at least one side wall, each receiver being situated in a side wall opposite to and in substantial alignment with a respective coating jet forming means for receiving an output therefrom;
   (d) introducing a coating compound into said coating hood through at least one feedpoint;
   (e) delivering air to said coating jet forming means with the coating compound entrained therein by first blower means, wherein the main body of said containers are coated with said coating compound;
   (f) supplying coating free air across the finish of said containers as the latter are transported through said coating hood by a plurality of finish air jet forming means positioned at a height above said coating jet forming means, said finish air jet forming means positioned on opposite sides of said containers, the finish air jet forming means on one side of said containers being offset in the longitudinal direction of said hood with respect to the finish air jet forming means on the other side of the containers;

(g) said step of supplying coating free air including the step of supplying an envelope of said coating fee air across the finish of said containers such that lateral boundaries of the envelopes of each finish air jet forming means on one side of said containers are substantially coincident with lateral boundaries of the envelopes of the offset and laterally adjacent finish air jet forming means on the other side of said containers;

(h) said step of supplying coating free air including the step of supplying said coating free air through said finish air jet forming means with a vertical separation of at least 2 cm from the air with the coating compound entrained therein which is supplied from said coating jet forming means; and (i) supplying said coating free air to said finish air jet forming means by second blower means.

10. A method as defined in claim 9; wherein said step of supplying an envelope includes the step of forming said lateral boundaries of said envelope to be substantially vertical by forming each said finish air jet forming means with an opening having a substantially rectangular configuration.

11. A method as defined in claim 9; wherein an air flow guide is secured between said side walls of said coating hood adjacent the upper end thereof, said air flow guide including a horizontal roof, first and second depending side walls, a stepped underside that terminates in centrally located inner top wall spaced below said roof, and a chamber defined between said roof, depending side walls, stepped underside and top wall; and said finish air jet forming means are formed in said stepped underside; and wherein said step of supplying coating free air includes the step of supplying said coating free air to the finish of said containers at a position spaced from said inner top wall of said air flow guide by a distance of approximately 0-1 cm.

12. A method as defined in claim 9; wherein said step of supplying coating free air includes the step of supplying said coating free air to said coating hood at a position inwardly spaced toward said containers with respect to the position that said air with coating material entrained therein is supplied to said containers.

13. A method as defined in claim 9; further comprising the step of supplying said coating free air in vertical alignment with and in the same direction as the high velocity air entrained with said coating material.

14. A method as defined in claim 9; wherein said vertical separation is in the range of approximately 2-8 cm.

15. A coating hood for applying protective coatings to glass containers having a main body and a finish, said coating hood comprising:

(a) a tunnel through which hot glass containers pass;

(b) means for contacting the outside surface of said containers with a coating chemical to form a metal oxide coating on said outside surface, when said containers are in said tunnel;

(c) a plurality of finish air jet forming means positioned on opposite sides of the finish of said containers for supplying coating free air across the finish of said containers as the latter are transported through said coating hood;

(d) the finish air jet forming means on one side of said containers being offset in the longitudinal direction of said hood with respect to the finish air jet forming means on the other side of the containers;

(e) each said finish air jet forming means supplying an envelope of said coating free air across the finish of said containers such that lateral boundaries of the envelope of each finish air jet forming means on one side of said containers are substantially coincident with lateral boundaries of the envelopes of the offset and laterally adjacent air jet forming means on the other side of said containers;

(f) said finish air jet forming means being vertically separated from said means for contacting by a distance of at least 2 cm; and (g) means for supplying said coating free air to said finish air jet forming means.

16. A method for applying protective coatings to glass containers having a main body and a finish, said method comprising the steps of:

(a) transporting the glass containers to be coated longitudinally through a coating hood;

(b) supplying a coating compound to the main body of said containers as the latter are transported between side walls of said coating hood;

(c) introducing a coating compound into said coating hood through at least one feedpoint;

(d) delivering a carrier gas to said hood with the coating compound entrained therein;

(e) supplying coating free air across the finish of said containers as the latter are transported through said coating hood by a plurality of finish air jet forming means positioned on opposite sides of the finish of said containers, the finish air jet forming means on one side of said containers being offset in the longitudinal direction of said hood with respect to the finish air jet forming means on the other side of the containers;

(f) said step of supplying coating free air including the step of supplying an envelope of said coating free air across the finish of said containers such that lateral boundaries of the envelopes of each finish air jet forming means on one side of said containers are substantially coincident with lateral boundaries of the envelopes of the offset and laterally adjacent finish air jet forming means on the other side of said containers;

(g) said step of supplying coating free air including the step of supplying said coating free air through said finish air jet forming means with a vertical separation of at least 2 cm from the gas with the coating compound entrained therein; and (h) supplying said coating free air to said finish air jet means.

* * * * *